Oct. 1, 1957 — R. H. THORNER — 2,808,042
SPEED CONTROLLED ENGINE OR THE LIKE
Filed March 21, 1951 — 3 Sheets-Sheet 1

INVENTOR.
ROBERT H. THORNER
BY Gregory S. Dolgorukov
ATTORNEY.

Oct. 1, 1957 R. H. THORNER 2,808,042
SPEED CONTROLLED ENGINE OR THE LIKE
Filed March 21, 1951 3 Sheets-Sheet 2

INVENTOR.
ROBERT H. THORNER
BY
Gregory S. Dolgoruko
ATTORNEY.

Oct. 1, 1957 R. H. THORNER 2,808,042
SPEED CONTROLLED ENGINE OR THE LIKE
Filed March 21, 1951 3 Sheets-Sheet 3

INVENTOR.
ROBERT H. THORNER
BY
Gregory S. Dolgorukov
ATTORNEY.

United States Patent Office 2,808,042
Patented Oct. 1, 1957

2,808,042

SPEED CONTROLLED ENGINE OR THE LIKE

Robert H. Thorner, Detroit, Mich.

Application March 21, 1951, Serial No. 216,822

40 Claims. (Cl. 123—108)

This invention relates to various machines and devices and in particular to governors intended to regulate the speed thereof. In a number of its aspects the invention relates to an internal combustion engine having improved speed governor or speed regulating means. The present application is a continuation-in-part of my co-pending application Serial No. 77,839, filed February 23, 1949, and now abandoned, for Governor Mechanism.

In constructing governors, particularly for internal combustion engines, the theoretical advantages of centrifugal governors have been well appreciated in the art. Such governors generate or produce centrifugal forces which vary in a certain well known relationship to the speed of the engine, and therefore provide a proper theoretical basis for attaining desired speed regulation, and offer requisite simplicity of operation. However, several practical difficulties encountered in constructing centrifugal governors have greatly hampered application of such governors, particularly for internal combustion engines. As a result thereof, centrifugal type governors have not attained a universal application, and other types of governors are in substantial use in many industrial and automotive applications, particularly with internal combustion engines.

One of the most critical difficulties in constructing centrifugal governors has been found in the presence of friction inherent in the construction of conventional governors of this general nature. The prime necessity for reducing to an absolute minimum all friction or drag in the operation of the governor mechanism has been well understood by those skilled in the art. It should be appreciated that in direct mechanical centrifugal governors, the revolving weights as well as any moving parts connected to and actuated thereby must not only move far enough to sense or indicate the speed change, but the speed differential (difference) must be of such magnitude that the weight force becomes far enough unbalanced from the opposing force (gravity or spring) to let the predominant one actually perform the work of moving the controlled member (such as engine throttle) against the inherent friction in the governor mechanism.

In governors in which the weights are positively connected to a servo-valve controlling a fluid circuit which, in turn, operates a pressure responsive member positively connected to the controlled member, the fluid circuit provides the force which performs the work of moving the controlled member, whereas the weights serve only to produce sensing forces acting on the servo-valve, which sensing forces are balanced by the forces of suitable resilient means. In such governors, the effects of any inconsistency in the movements in the flyweight mechanism or in a sliding servo-valve created by friction as well as dirt, gum, surface wear, and like causes are amplified at the controlling member because of the amplifying nature of the mechanism itself.

From the above, it can be now appreciated that the lower is such friction, the smaller is the required speed differential, and the more sensitive is the governor.

At this point it is important to appreciate the difference between the objectionable results of friction in a governor mechanism, and the action of the forces opposing outward movement of the revolving weights. The latter forces, usually the force of gravity or a spring force, are consistent in their magnitude. Such a consistent force when balanced may be overcome by the slightest overpowering force, providing there is no frictional resistance. The frictional resistance encountered in conventional direct centrifugal governors or in the pilot valve and flyweights of centrifugal-servo governors not only is highly undesirable in any form, but much worse, such frictional resistance is not consistent in its magnitude due to the difference between the static and dynamic coefficients of friction, dirt, gum, surface wear and like causes, and abruptly diminishes after being overcome by a force producing relative movement of parts in frictional contact. Such inconsistency causes delayed response of the governor mechanism to changed conditions, and may produce unstable operation of the governor. Reducing the friction in governors has been done mainly by costly precision machining of the governor parts, use of ball bearings, hardening and grinding or even lapping various surfaces, and for centrifugal servo-governors having sliding "spool" type pilot valves, mechanism is usually provided to rotate the valves. These expedients result in only a reduction of friction and not in the elimination thereof. Such reduction of friction is not only incomplete, but the cost of manufacturing is usually increased to such an extent as to make such governors not practical for many applications.

Another puzzling problem in this art is found in the necessity or great desirability of corelating the operating forces produced by the revolving weights and the forces opposing their outward movement (such as gravity or springs) in such a manner as to produce close regulation at all governed, particularly low, speeds.

One of the main objects of the present invention is to provide an improved speed governor whereby the difficulties and disadvantages of prior governor constructions are overcome and largely eliminated, and a simple, virtually frictionless governor is produced insuring its instantaneously responsive, consistent, and dependable performance.

Another object of the invention is to provide an improved governor of the centrifugal type which is more sensitive, gives closer regulation, and is particularly advantageous in automotive applications.

A further object of the present invention is to provide an improved governor of the centrifugal type in which the constrained surfaces, or surfaces in sliding contact are virtually eliminated in the suspension of the revolving weights, in the weight forces transmitting mechanism, and in the mechanism actuating the final control member.

A still further object of the present invention is to provide an improved governor of the centrifugal type which is much simpler in construction and is much less expensive to manufacture than conventional governors, and in which governor such advantages inherently result from its construction and not from elimination of any desired mechanism or decreasing the quality thereof.

A still further object of the invention is to provide an improved governor of the centrifugal type which is compact and rugged in construction, is very light, has small number of parts, is not liable to get out of order for a number of years of operation, has no lost motion in its parts, and requires minimum of attention after installation.

A still further object of the present invention is to provide an improved governor of the foregoing nature which inherently reduces in a substantial manner the problem of coordinating in a desired manner the forces produced by the revolving weights and the forces utilized to oppose the same.

A further object of the present invention is to provide an improved servo-governor of the centrifugal type in which the constrained surfaces, or surfaces in sliding contact are virtually eliminated in the suspension of the revolving weights and in the suspension of the servo-modulator or pilot valve which controls the final control member.

It is an added object of the present invention to provide an improved governor of the foregoing nature, particularly but not exclusively for internal combustion engines, which is simple in construction, safe and dependable in operation, is easy to install and service, and relatively inexpensive to manufacture.

Further objects and advantages of the invention will be apparent from the following description, taken in connection with the appended drawings, in which.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention I provide an improved governor of the centrifugal type in which the mechanism producing centrifugal or weight forces does not include any surfaces in relatively sliding contact, such as are found in bearings, hinges, sliding collars, and similar expedients wherein friction is inherent and unavoidable. I provide the desired construction preferably by utilizing thin leaf springs of negligible rate, whereby the required change in positions of various members is produced by bending such springs within their elastic limit, and therefore is resisted only by the internal or molecular resistance of such springs to bending; which resistance in thin springs (such as say, .005" thick) is not only negligible but, as is particularly important, is consistent throughout the entire elastic range thereof. I utilize the exceedingly high resistance of such springs to side bending to produce exceedingly rigid constructions yielding only in a single predetermined direction.

I utilize such a construction in the weight suspension mechanism, weight forces transmitting mechanism, and the mechanism actuating the final control member, or in any one or two of such mechanisms, as well as in the suspension of the servo modulator valves of the governors utilizing the same.

While the present invention is described with reference to an internal combustion engine having a governor regulating the speed thereof, it will be understood that the invention is not limtied thereto, and that it is fully applicable to other installations; my improved governor may also be used for regulating in response to speed, performance factors other than speed, or for actuating other devices in response to speed.

Figure 1:
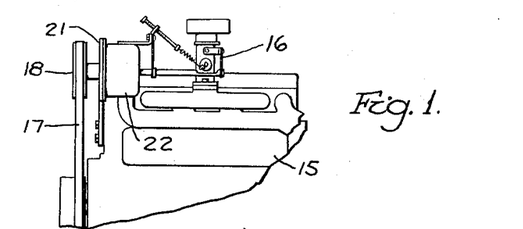
Fig. 1 is a side view of an internal combustion engine including a speed governor embodying the present invention.
Figure 2:
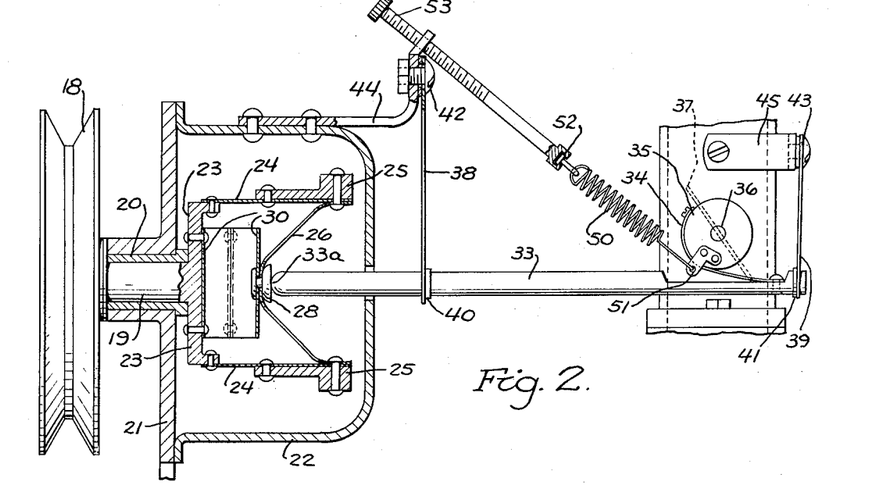
Fig. 2 is a view, partly in section, showing the governor of Fig. 1 on an enlarged scale, with governor parts being shown in their respective positions corresponding to the partially open position of the carburetor throttle.
Figure 3:
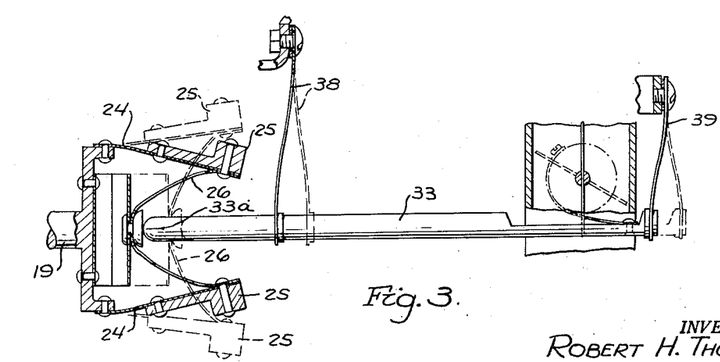
Fig. 3 is a view similar in part to Fig. 2, showing the range of operative mechanical movements of the governor parts and the carburetor throttle.
Figures 4, 5:
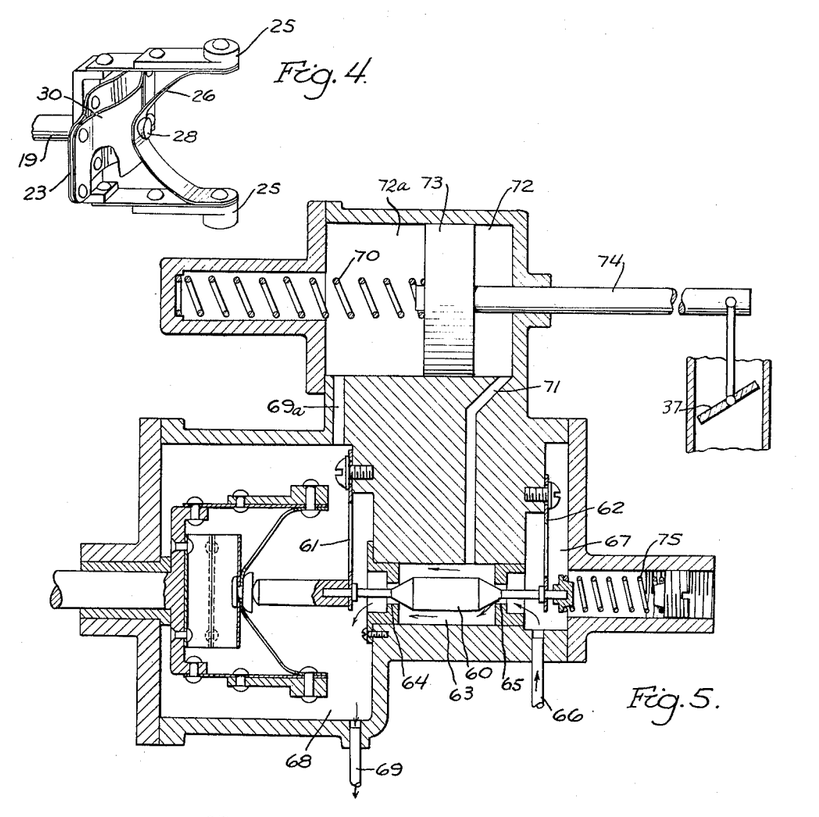
Fig. 4 is a perspective view of the centrifugal weight assembly of the governor of Figs. 1–3.
Fig. 5 is a modified construction of the governor showing the form including a fluid servo mechanism.

In the drawings, there is shown by way of example governor mechanisms embodying the present invention. Referring specifically to Figs. 1–4, the governor shown therein is incorporated into the construction of an internal combustion engine to control the speed thereof. In the embodiment shown, the governor mechanism actuates the carburetor throttle. It will be understood, however, that it may be made to actuate a separate governor throttle operatively mounted within a sandwich type governor body. In Fig. 1, the numeral 15 designates an engine having a carburetor 16, and a fan belt 17 passed over a pulley 18 mounted on the governor shaft 19 journaled in a bearing 20 provided in a frame plate 21 of the governor casing 22, attached to the engine in any suitable manner. The shaft 19 has radial extensions 23 provided thereon to which there are connected with the aid of leaf springs 24 two centrifugal weights 25. The weights 25 are connected together with the aid of a C-shaped leaf spring 26 carrying a rivet button 28 and adapted to convert the radial movements of the weights 25 into axial movements of the button 28. Means are provided to prevent undesirable side or radial movements of the button 28. In the embodiment of Figs. 1–4, said means are exemplified by cross leaf springs 30 having ends connected together and middle portions connected to the shaft extensions 23 and the button 28, respectively, as is best shown in Fig. 4. The leaf springs 24, 26 and 30 as well as other leaf springs hereinafter described are made preferably of SAE spring steel approximately .003"–.010" thick, or stainless steel thin sheet stock, or phosphor-bronze sheet, or beryllium-copper sheet. Any other sheet material having consistent elasticity may also be used. Strips of such stock have virtually no resistance to bending perpendicularly to their plane but offer very high resistance to bending within their plane, and more important are consistent in their action.

By virtue of such a construction, the button 28 is free to move axially in response to radial movements of the centrifugal weights, but is restricted from any side or radial movements. The rivet button 28 may be profiled in its surface contracting the spring 26 to control its configuration in bending by wrapping on or against said profiled surface of the button, see Fig. 3 to prevent the spring from exceeding its elastic limit at points thereof near the button.

Means are provided to transmit the forces produced by the centrifugal weights from the button 28 to the carburetor throttle. In the embodiment of the invention illustrated in Figs. 1–4 said means are exemplified by a bar member 33 having a rounded end 33a bearing on the button 28 to give a limited area contact or substantially a point contact therewith. The opposite end of the bar 33 is recessed and connected in any suitable manner to one end of a leaf spring or strap 34. The other end of the strap 34 is secured to a crank or guide member 35 mounted on the shaft 36 of the carburetor throttle 37.

The bar 33 is frictionlessly suspended with the aid of two leaf springs 38 and 39 for limited axial movement. The lower ends of the springs 38 and 39 are secured to the bar 33 in any suitable manner. In the present embodiment said ends bear against flanges 40 and 41 provided on the bar 33 and are soldered thereto. The upper ends of the springs 38 and 39 are secured as at 42 and 43 to supporting structures, in the present embodiment to the casing 22 and carburetor body, with the aid of suitable brackets, such as 44 and 45.

Means are provided to virtually eliminate the source of frictional resistance at the rounded end 33a of the bar 33, due to curvature in the travel of the lower ends of the springs 38 and 39. In the present embodiment such means are effected by the provision of spring 39 shorter than the spring 38, and connection of spring 38 to the bar 33 at a predetermined distance from the rounded end of said bar. Operation of such means can be easily understood from the following explanation: presuming both springs 38 and 39 to be in their middle or vertical positions, the movement of the bar 33 to the extreme right or to the left positions would tend to raise the rounded end of the bar because of the arcuate character of the path of the end of the spring 38. If springs 38 and 39 were of the same length such undesirable condition would prevail. However since the spring 39 is shorter, the upward movement of the right end of the bar 33 is greater than the upward movement of the bar 33 at spring 38, in consequence whereof the bar rotates for a small angle around its center at the spring 38, moving the rounded end 33a downward (as the construction appears on the drawing), thereby compensating for its upward movement. By a proper selection of the respective lengths of the springs 38 and 39 and the distance between them as well as of the distance between the flange 40 and the rounded end of the bar 33, the tendency of the rounded end 33a to slide on the button 28 may be substantially eliminated and substituted by only rocking or rolling thereof on said button. The desired movement of the rounded end 33a may also be obtained by the expedient shown in Figs. 8, 9 and 10 and hereinafter described. It should be appreciated at this point that frictional resistance at the point of contact of the rounded end 33a of the bar and the button 28 as well as in the bearing 20 of the governor due to its rotation is overcome by the driving force. This frictional resistance is not in the direction of governor controlling or responsive movements, and therefor it does not affect the frictionless character of my governor.

A tension spring 50 operatively mounted at the crank 35 is adapted to oppose with predetermined forces the outward radial movements of the weights 25. The spring 50 is so selected that the balance between the opposing force of the spring and the forces developed by the weights 25 is established at a desired speed of the governor and consequently of the engine. One end of the spring 50 is secured to the circular crank 35 with the aid of a bracket 51, while its other end is connected with the aid of a swivel 52 to an adjustment screw 53 mounted in a suitable supporting structure for convenient reach by the operator. In the present embodiment the screw 53 is mounted in the bracket 44. By turning the screw 53, the spring 50 is stretched or shortened, whereby its tension is adjustably varied. This, in turn, adjustably changes the point at which the balance of the forces mentioned above occurs, and therefore adjustably varies the governed speed of the engine.

It will now be clear in view of the foregoing that in operation of the engine as the engine starts from rest the governor throttle is wide open, and as the engine is accelerated toward the predetermined governed speed this throttle remains in the wide open position. When the governed speed is attained the governor throttle is closed sufficiently by the action of the weights until the balance of forces in the governor is established at the governed speed. When such a balance occurs at the desired speed, increase of the engine speed causes further outward movement of the weights 25, movement of the button 28 and rod 33 to the right, and movement of the throttle 37 in the closing direction, restricting the flow of fuel mixture to the engine until the speed thereof is decreased to its desired value. Decrease in the speed of the engine below the predetermined speed brings about the reverse operation of the governor.

In any speed-regulating mechanism for reasons discussed above, it is highly desirable that the friction of all the elements which move in response to speed changes must be minimized. The total of the elements that move together in response to speed changes might be termed the "sensing-mechanism" and may or may not encompass the entire speed-regulating mechanism depending on its construction or type. In the embodiment shown in Fig. 2, which is a direct-acting centrifugal governor, virtually all elements of the overall governor combination are a part of the sensing-mechanism since they all move together in direct response to speed variations, and friction in any of the moving parts would be highly detrimental to the operation of the governor. It is apparent from the above description that virtually all sliding surfaces and hence all friction in the combination of elements in the present invention are substantially eliminated in its speed-responsive movements, and that such substantial elimination of friction inherently is accompanied by a simplified structure compared to conventional direct-acting speed-regulating mechanisms.

The governor described above and illustrated in Figs. 1–4 is of a direct acting type, in which the centrifugal unit or device is connected directly to the controlled member, which in the embodiment shown is the carburetor throttle. In some instances where large forces are required to operate the controlled member it may be desired to amplify the force derivable from the centrifugal unit. This may be done by introducing a fluid servo mechanism between the bar member and the controlled member.

Fig. 5 illustrates a governor of the servo mechanism type, in which the centrifugal unit similar to that of the governor of Figs. 1–4, is connected to and controls a pilot valve or servo modulator valve 60 suspended by leaf springs 61 and 62. It will be apparent that any type of servo-pilot valve may be used although the modulator type is preferred providing it has the frictionless characteristics disclosed herein. The servo pilot valve 60 is operatively arranged within the chamber 63 having two restricted orifices 64 and 65 forming a part of a fluid circuit including the conduit 66 connected to a source of fluid pressure, chamber 67, chamber 63, the chamber 68 formed by the governor housing and connected through the conduit 69 with the atmospheric pressure return to the fluid source. The pressure in the chamber 63 is transferred through a passage 71 to the cylinder 72 in which there is slidably fitted a piston 73 having a piston rod 74 (equivalent to rod 33, Fig. 1) connected to the controlled member such as the throttle 37. The spring 70 opposes the forces exerted by the pressure transferred to the cylinder and acting on the piston 73. A spring 75 opposes the outward radial movements of the centrifugal weights, and is provided with adjustment means by which the "governed speed" may be adjusted.

With such a construction, increase of the speed above a predetermined value thereof, causes unbalance of the forces in the governor, causing further outward movements of the weights, movement of the valve 60 to the right thereby gradually reducing the opening of orifice 65 and gradually increasing the opening of orifice 64, thus causing decrease of pressure in the chambers 63 and 72, in consequence thereof the spring 70 moves the piston 73 to the right, which is presumed to be the direction in which the controlled member must be moved to decrease the speed of the controlled device and the governor. Decrease of the speed of the governor below a predetermined value causes a reverse operation of the governor. In the form shown, the modulator valve 60 is a particular form of pilot valve in which the pressure in chambers 63 and 72 varies gradually or is "modulated" as a function of the movement of the pilot-valve. Both orifices 64 and 65, which are in series, are shown variable which permits modulation of the pressures in chambers 63 and 72 between the values of pressure at the inlet conduit 66 and at the outlet chamber 68. A single variable orifice may be used with the other orifice being of fixed size, but this arrangement will not give the full range of pressure-modulation as will two variable orifices in series, which is highly important in certain applications. The details of construction of the fluid circuit and of the servo pilot valve as well as the operation thereof are described in detail in my said co-pending applications and particularly in my co-pending patent application Serial No. 216,821 filed March 21, 1951, now Patent 2,737,165, March 6, 1956, and need not be further described herein.

In the servo-type speed-regulating device shown in Fig. 5, the speed "sensing-mechanism" comprises all of the elements that must move together directly in response to speed variations, which elements are the flyweight mechanism, the pilot-valve (or modulator valve) 60 with its leaf-spring supports 61 and 62, the biasing spring 75, and any connection of these elements. The servo-motor, which includes elements 70 to 74 for actuating the engine throttle (37 in Fig. 2 and assumed to be the same in Fig. 5), minimizes friction percentagewise in view of the large actuating forces available by using a high-pressure fluid at inlet conduit 66 and/or a large area of piston 73, or the like. Thus, in the form shown in Fig. 5, which is preferred in many applications, the entire sensing-mechanism is substanitally free of all sliding-surface contact and hence is substantially frictionless in its speed-responsive movements; and these relatively small movements (and forces) of the sensing-mechanism are amplified to any desired amount by the servo-motor which follows precisely the movements of the pilot valve 60 due to the aforesaid frictionless characteristics of the entire sensing-mechanism. Such desirable characteristics of the "sensing-mechanism" are accomplished inherently wth a structure which is simpler and less critical to manufacture than conventional fluid governors with servo-mechanisms.

Figure 6:
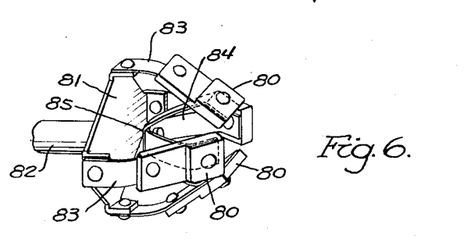
Fig. 6 is a perspective view of a modified construction of the weight assembly or centrifugal device.

Fig. 6 illustrates a centrifugal weight device or unit of a modified construction. In this construction four weights 80 are provided, said weights being connected to the flange 81 of the shaft 82 with the aid of leaf springs 83. A cross leaf spring 84 interconnects all four weights together and imparts requisite radial rigidity to its button 85 movable axially in response to outward movements of the weights 80.

Figures 7, 8:
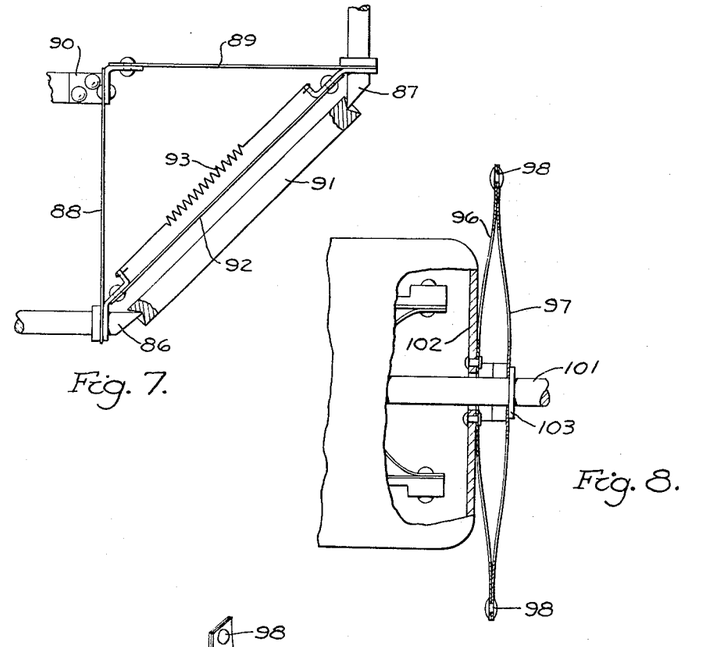
Fig. 7 is a side view of a frictionless device for changing at an angle the direction of the forces produced by the centrifugal weights assembly.
Fig. 8 shows a modified construction of frictionless suspension of the force-transmitting rod of the governor.

Fig. 7 illustrates a device for changing the direction of the governor force at a desirable angle. In the embodiment illustrated the change of direction is at 90 degree angle. In this construction, the ends 86 and 87 of the bar members disposed at a 90 degree angle to each other are suspended with the aid of leaf springs 88 and 89 secured to a supporting bracket 90, and are provided with sharp ends, as shown. Said ends enter into the conical end recesses of a diagonal bar 91 to effect a frictionless point contact therewith. A leaf spring 92 and a tension coil spring 93 maintain the assembly in operative position and yet permit easy and quick removal of the diagonal bar 91 and further disassembling of the device. The bar 91 is necessary only in installations requiring transmission of compression forces, while only the spring 92 is necessary in installations requiring transmission of tension forces.

Figure 9:
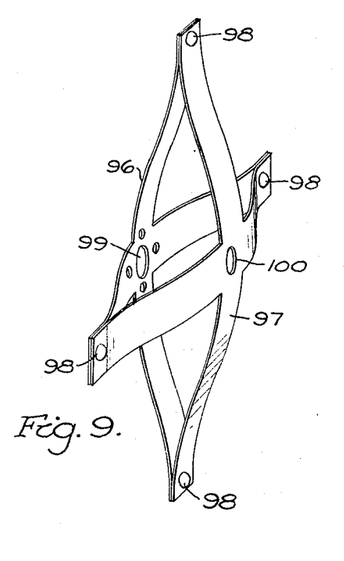
Fig. 9 is a perspective view of the leaf spring connection of Fig. 8.

Figs. 8 and 9 illustrate a modified leaf spring suspension of the bar member 33 (Fig. 2) or the pilot valve 60 (Fig. 5), which eliminates the effect of the arcuate path of the end of the strip leaf springs described above. In this construction two cross leaf springs 96 and 97 have their ends secured together, as shown at 98, and openings 99 and 100 provided in their central portions for passage of the rod member 101 (or the pilot valve 60 in Fig. 5). The cross spring 96 is secured to the governor housing 102, as shown, and clears the bar member 101 while the cross spring 97 is soldered or otherwise secured to a flange 103 provided on the bar member 101. With such a construction the bar member 101 moves axially frictionlessly and without any axial misalignment.

Figure 10:
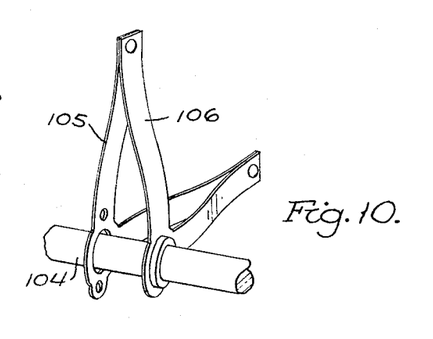
Fig. 10 is a perspective view showing a further modified construction of leaf spring suspension for the force transmitting bar.

Fig. 10 illustrates a spring suspension for a bar member 104 (or the pilot valve 60 in Fig. 5), which suspension is similar in its construction and operation to the suspension of Figs. 8 and 9 but has the advantage of occupying less space. In this construction the springs 105 and 106 (corresponding to the springs 96 and 97 of the construction of Figs. 8 and 9) are of angular construction, i. e. have their legs extend at 90 degree angles to each other.

By virtue of the construction described above the objects of the invention listed above and numerous additional advantages are attained.

I claim:

1. In a governor device for a rotatable machine comprising a rotatable member, and a control member to regulate the speed of rotation of said machine, the combination comprising, a plurality of leaf springs secured to said rotatable member, a corresponding plurality of weights secured to said springs, respectively, for rotation therewith, said leaf springs being bent by radial movements of said weights as the rotatable member is rotated, a leaf spring member connected to said weights and having a portion movable axially in response to radial movements of said weights, a force-transmitting bar arranged for movement substantially in the direction of the axis of said rotatable member and having one end contacting the axially moving portion of said leaf spring member and its other end connected to said control member, a plurality of spaced leaf springs supporting said bar, and a spring to oppose with predetermined forces the outward radial movements of said revolving weights, whereby movements of said weights, said bar member, said leaf spring member and said spring are substantially frictionless and thereby respond to minute changes in the forces produced by rotation of said weights to actuate said control member.

2. In a governor device for a rotating machine having a control member to regulate the speed of rotation of said machine and including movable means connected for actuation of said control member, the combination of means for effecting movement of said movable means and cooperating control member comprising, a centrifugal device driven by said rotating machine and including substantially frictionless means to produce forces which are a function of the speed thereof, a member movable in response to said forces, substantially frictionless swingable supporting means for said movable member imparting rigidity in one direction to constrain said movable member for movement in a direction substantially transverse to said first direction, said movable member including means directly contacting said centrifugal device for establishing a connection which is substantially frictionless in its speed-responsive movements, means associated with said movable member to effect a speed-controlling movement of said movable means and cooperating control member, and substantially frictionless biasing means opposing the forces produced by said centrifugal device, said elements and means being so arranged that the combined speed-responsive movements of said force-producing means, said movable member, said contact means and said biasing means are substantially frictionless and thereby capable of responding to minute changes in the forces produced by said centrifugal device to actuate said control member.

3. The combination of means defined in claim 2, wherein said force producing means includes leaf spring means, and said swingable support comprises leaf spring means.

4. The combination of elements defined in claim 2 in which said means associated with said movable member to effect a speed controlling movement of said movable means and cooperating control member includes a servo mechanism.

5. The combination of elements defined in claim 2 in which said centrifugal device includes flyweight means including at least one leaf spring member, and means associated with said leaf spring member acting as a fulcrum at one point of said leaf spring member to guide bending movements thereof, and said fulcrum having a smoothly contoured portion gradually diverging from the surface of said leaf spring member to control its configuration in bending by wrapping around said contoured portion, whereby the stresses imposed by bending said leaf spring will not exceed its elastic limit.

6. In a governor for a rotating machine having a control member to regulate the speed of rotation thereof, the combination of means to actuate said control member comprising, a centrifugal device driven by said rotating machine and including substantially frictionless flyweight means to produce forces which are a function of the speed thereof, an actuating bar member responsive to said forces, substantially frictionless swingable supporting means for said bar member constraining said bar member for substantially axial movement, said bar member including means directly contacting said centrifugal device for substantially frictionless axial movement, a substantially frictionless flexible tension connection member for connecting said bar member and said control member whereby axial movements of said bar member cause a speed-controlling movement of said control member, and substantially frictionless biasing means opposing the forces produced by said centrifugal device, whereby the combined speed-responsive movements of said force producing means, said bar mmeber, said bar contacting means, said flexible connection member and said biasing means are substantially frictionless and thereby respond to minute changes in the forces produced by said centrifugal device to actuate said control member.

7. In a governor for a rotating machine having control means to regulate automatically the speed of rotation thereof, rotating means, substantially frictionless means associated with said rotating means to produce forces which vary as a function of the rotary speed of said machine, said control means including a movable member responsive to said forces and contacting said force-producing means, substantially frictionless swingable supporting means for said movable member, said supporting means being disposed to impart rigidity in one direction to constrain said supported member for substantially frictionless movements in a direction substantially transverse to said first direction, and substantially frictionless biasing means opposing the forces produced by said force-producing means, said elements and means being so arranged that the combined speed responsive movements of said force-producing means, said movable member, and said biasing means are substantially frictionless and thereby respond to minute changes in said forces varying as a function of speed.

8. The combination of elements defined in claim 7 in which said swingable means includes spaced substantially parallel leaf spring members.

9. The construction defined in claim 7, and including adjustment means for said biasing means.

10. In a governor for a rotating machine having a control member to regulate the speed of rotation thereof, the combination of means to actuate said control member comprising a centrifugal device driven by said rotating machine and including substantially frictionless flyweight means to produce forces which are a function of the speed thereof, an actuating bar member responsive to said forces, substantially frictionless swingable supporting means for said bar member imparting rigidity in one direction to constrain said bar member for movement in a direction substantially transverse to said first direction, said bar member including means contacting said centrifugal device, a connection between said bar member and said control member whereby axial movements of said bar member cause a speed-controlling movement of said control member, and substantially frictionless biasing means opposing the forces produced by said centrifugal device, said elements and means being so arranged that the combined speed-responsive movements of said force producing means, said bar member, and said biasing means are substantially frictionless and thereby respond to minute changes in the forces produced by said centrifugal device to actuate said control member.

11. The combination of means defined in claim 10, wherein said swingable supporting means comprises spaced leaf spring members.

12. In a governor for a rotating machine having a control member to regulate the speed of rotation thereof, the combination of means to actuate said control member comprising, a centrifugal device driven by said rotating machine to produce forces which are a function of the speed thereof, an actuating member responsive to said forces, substantially frictionless swingable supporting means for said actuating member constraining said actuating member for substantially axial movement, said actuating member including means directly contacting said centrifugal device for substantially frictionless speed-responsive movements, means associated with said actuating member adapted to be connected to said control member to effect movements thereof whereby speed-responsive movements of said actuating member cause a speed-controlling movement of said control member, and substantially frictionless biasing means opposing the forces produced by said centrifugal device, whereby the combined speed-responsive movements of said actuating member, said contacting means, and said biasing means are substantially frictionless and thereby respond to minute changes in the forces produced by said centrifugal device to actuate said control member.

13. A control device to operate a movable controlled member from a rotatable member comprising, a centrifugal device driven by said rotatable member and including substantially frictionless flyweight means to produce forces which are a function of the speed thereof, an actuating bar member responsive to said forces, substantially frictionless swingable supporting means for said bar member imparting rigidity in one direction constraining said bar member for movements in a direction substantially transverse to said first direction, said bar member including means directly contacting said centrifugal device for substantially frictionless speed responsive movements, a substantially frictionless flexible tension connection member for connecting said bar member and said controlled member whereby axial movements of said bar member cause movement of said controlled member, and substantially frictionless biasing means opposing the forces produced by said centrifugal device, whereby the combined speed-responsive movements of said force producing means, said bar member, said bar contact means, said flexible connection member and said biasing means are substantially frictionless and thereby respond to minute changes in the forces produced by said centrifugal device to actuate said controlled member.

14. A control device to operate a movable controlled member from a rotatable member comprising, a centrifugal device driven by said rotatable member and including substantially frictionless flyweight means to produce forces which are a function of the speed thereof, an actuating member responsive to said forces, substantially frictionless swingable supporting means for said actuating member disposed to impart rigidity in one direction to constrain said actuating member for movements in a direction substantially transverse to said first direction, said actuating member including means directly contacting said centrifugal device for substantially frictionless speed-responsive movements, means associated with said actuating member to produce forces acting on said controlled member to effect movements thereof whereby speed-responsive movements of said actuating member cause movement of said controlled member, and substantially frictionless biasing means opposing the forces produced by said centrifugal device, said elements and means being so arranged that the combined speed-responsive movements of said force producing means, said actuating member, said contacting means, and said biasing means are substantially frictionless and thereby respond to minute changes in the forces produced by said centrifugal device to actuate said controlled member.

15. A control device in accordance with claim 14 wherein said swingable means comprises a pair of spaced substantially parallel leaf springs.

16. A control device to operate a movable controlled member from a rotatable member comprising, a centrifugal device driven by said rotatable member to produce forces which are a function of the speed thereof, an actuating member responsive to said forces, substantially frictionless swingable supporting means for said actuating member constraining said actuating member for substantially axial movement, said actuating member including means directly contacting said centrifugal device for substantially frictionless speed-responsive movements, means associated with said actuating member to produce forces acting on said controlled member to effect movement thereof whereby axial movements of said actuating member cause movement of said controlled member, and substantially frictionless biasing means opposing the forces produced by said centrtifugal device, whereby the combined speed-responsive movements of said actuating member, said contact means, and said biasing means are substantially frictionless and thereby respond to minute changes in the forces produced by the said centrifugal device to actuate said controlled member.

17. The combination of means defined in claim 16, in which said actuating member comprises a first bar member, and said means associated with said actuating member includes means to change the direction of forces applied to said first bar member comprising, a second bar member disposed at an angle to said first bar member, substantially frictionless swingable means to support said second bar member and constraining said second bar member for substantially frictionless movement in its axial direction, and force-transmitting connecting means having substantially frictionless connections at each of said two bar members whereby said first bar member transmits forces to said second bar member through said connecting means and the combined movements of said first and second bar members and said connecting means are substantially frictionless.

18. The combination of elements defined in claim 17 in which said connecting means comprises a third bar member, and substantially frictionless pivotal contact connections between said third bar member and said first and second bar members.

19. The combination of elements defined in claim 17 in which said connecting means comprises a flexible tension member connecting the respective ends of said first and second bar members.

20. In a control device to operate a movable controlled member from a rotatable member comprising, a centrifugal device driven by said rotatable member to produce forces which are a function of the speed thereof, bar means arranged for movement substantially in the direction of the axis thereof and having one end in abutting contact with said device, and two substantially frictionless swingable members supporting said bar means, the supporting member closer to said device being longer than the supporting member remote therefrom, the relative length and spacing of said supporting members being such that the abutting contact of said bar means and said device is maintained substantially without sliding as said bar means swings on its supporting members.

21. In a control device to operate a movable controlled member from a rotatable member comprising, a centrifugal device driven by said rotatable member to produce forces which are a function of the speed thereof, bar means arranged for movement substantially in the direction of the axis thereof and having one end contacting said device, a substantially frictionless swingable support for said bar means comprising a pair of leaf springs adjacent one end of said bar means, one end of one of said spring pair being fixed to a stationary member, and one end of the other of said spring pair being fixed to said bar, the other corresponding free ends of both of said springs being fixed together, and a second similarly arranged spring pair adjacent the opposite end of said bar means whereby said bar means is constrained for substantially axial movement.

22. A governor for an engine having a throttle rotatably mounted on a shaft, a centrifugal device driven by said engine to produce forces which are a function of the speed thereof, an actuating member connected to said device and responsive to said forces produced thereby, biasing means to oppose the forces produced by said centrifugal device, a guide member mounted on said throttle shaft, and means including a flexible tension connecting member connected to said actuating member and wrapped around said guide member to translate movement of said actuating member into predetermined rotational movement of said throttle.

23. The combination of elements defined in claim 22, in which said guide member is circular, whereby said flexible tension member transmits force to said throttle at a uniform radius from said throttle shaft.

24. In a governor device for a rotating machine having a control member to regulate the speed of rotation of said machine, the combination of means for effecting movement of said control member comprising, a pressure responsive member adapted to be connected to said control member for actuation thereof, a fluid circuit having a flow of fluid therethrough and communicating with said pressure responsive member, valve means in said fluid circuit for directing fluid therein to said pressure responsive member for effecting movements thereof, said valve means including a valve body member and a mating member cooperable therewith, substantially frictionless swingable supporting means for one of said valve members, said supporting means being disposed to impart rigidity in one direction to constrain said supported valve member for substantially frictionless movements in a direction substantially transverse to said first direction and to prevent surface contact of said supported valve member during operational movements thereof, a centrifugal device driven by said rotating machine and including substantially frictionless flyweight means to produce forces which vary as a function of the rotary speed thereof and acting on said supported valve member to effect speed-responsive movements thereof for producing movements of said pressure responsive member with amplified forces for moving said control member, substantially frictionless biasing means opposing the forces produced by said flyweight means, said elements and means being so arranged that the combined speed responsive movements of said supported valve member, said flyweight means, and said biasing means are substantially frictionless and thereby respond substantially instantaneously and consistently to minute changes in said forces produced by said flyweight means caused by changes in the rotary speed of said machine to effect movement of said control member.

25. The combination of elements defined in claim 24 in which said swingable means includes spaced substantially parallel leaf springs, and said substantially frictionless flyweight means includes at least one revolving weight, and at least one substantially frictionless thin bendable strip member to support and guide said weight in frictionless radial movements.

26. The combination of elements defined in claim 24 in which said fluid flow circuit includes at least two fluid restrictions, and said pressure responsive member communicates with said circuit at a point between said two restrictions, and said supported valve member varies the restrictive effect of at least one of said restrictions for modulating pressure in said circuit acting on said pressure responsive member.

27. The combination of elements defined in claim 24, and variable force second biasing means acting on said pressure responsive member with forces varying as a direct function of the forces produced thereon by fluid pressure in said fluid circuit acting on said pressure responsive member, and said valve means controlling pressure on only one side of said pressure responsive member, and said first biasing means having a force varying as a function of the movement of said supported valve member, and the configuration of said valve body member in relation to said mating member adapted to produce modulated pressures acting on said pressure responsive member to effect movement thereof as a function of the movement of said supported valve member.

28. The combination of elements defined in claim 27 in which said fluid circuit includes two restrictions therein, and said pressure responsive member communicates with said fluid circuit at a point between said two restrictions, and said valve means modulates the restrictive effect of at least one of said restrictions to produce said modulated pressures acting on said pressure responsive member.

29. In a governor device for a rotating machine having a control member to regulate the speed of rotation of said machine, the combination of means for effecting movement of said control member comprising, a pressure responsive member adapted to be connected to said control member for actuation thereof, a fluid circuit having a flow of fluid therethrough and communicating with said pressure responsive member, valve means in said fluid circuit for directing fluid therein to said pressure responsive member for effecting movements thereof, said valve means including a valve body member and a mating member cooperable therewith, substantially frictionless swingable supporting means for one of said valve members, said supporting means being disposed to impart rigidity in one direction to constrain said supported valve member for substantially frictionless movement in a direction substantially transverse to said first direction and to prevent surface contact of said supported valve member during operational movements thereof, a centrifugal device driven by said rotating machine and including flyweight means to produce forces which vary as a function of the rotary speed thereof and acting on said supported valve member to effect movements thereof for producing movements of said pressure responsive member with amplified forces for moving said control member, substantially frictionless biasing means opposing the forces produced by said flyweight means, whereby the combined speed responsive movements of said supported valve member and said biasing means are substantially frictionless and thereby respond substantially instantaneously and consistently to minute changes in said forces produced by said flyweight means caused by changes in the rotary speed of said machine to effect movement of said control member.

30. A control device to operate a movable controlled member from a rotatable member comprising, a pressure responsive member adapted to be connected to said controlled member for actuation thereof, a fluid circuit having a flow of fluid therethrough and communicating with said pressure responsive member, valve means in said fluid circuit for directing fluid therein to said pressure responsive member for effecting movements thereof, said valve means including a valve body member and a mating member cooperable therewith, substantially frictionless swingable supporting means for one of said valve members, said supporting means being disposed to impart rigidity in one direction to constrain said supported member for substantially frictionless movement in a direction substantially transverse to said first direction and to prevent surface contact of said supported valve member during operational movements thereof, a centrifugal device rotatably driven by said rotatable member and including substantially frictionless flyweight means to produce forces which vary as a function of the rotary speed thereof and acting on said supported valve member to effect speed-responsive movements thereof for producing movements of said pressure responsive member with amplified forces for moving said controlled member, substantially frictionless biasing means opposing the forces produced by said force-producing means, said elements and means being so arranged that the combined speed-responsive movements of said supported valve member, said force-producing means, and said biasing means are substantially frictionless and thereby respond substantially instantaneously and consistently to minute changes in said forces produced by said centrifugal device effected by changes in the rotary speed of said rotatable member to effect movement of said controlled member in response to changes in said rotary speed.

31. The combination of elements defined in claim 30 in which said swingable means comprise spaced substantially parallel leaf spring members.

32. The combination of means defined in claim 30, in which said movable flyweight means includes at least two weights, and substantially frictionless swingable members acting to support each of said weights for substantially frictionless radial movements, said swingable members having rigidity in a direction transverse to the direction of said radial movements, a substantially frictionless flexible tension member connecting said weights and having a portion adapted to move axially in response to radial movements of said weights for transmission of said forces varying with speed, and said supported valve member contacting said movable portion of said tension member for establishing a connection which is substantially frictionless in its speed responsive movements and for effecting said speed responsive movements of said supported valve member.

33. In a mechanism to operate a member in accordance with changes in a variable factor comprising, means responsive to said variable factor and including means to produce forces which are a function of said variable factor, a movable member responsive to said forces and connected to said first-named means, a substantially frictionless swingable support for said movable member comprising a pair of leaf springs, each of said spring pair being V-shaped and having two legs substantially at right angles to each other in the same plane, the end joining the two legs of one of said spring pair being fixed to a stationary member, and the end joining the two legs of the other of said spring pair being fixed to said movable member, the other corresponding two free ends of both of said springs being fixed together.

34. In a control mechanism to operate a movable controlled member from a rotatable member comprising, a centrifugal flyweight device driven by said rotatable member and including substantially frictionless flyweight means to produce forces which vary as a function of the rotary speed thereof, said flyweight means including at least two weights, a substantially frictionless flexible tension member connecting said weights and having a portion adapted to move axially in response to radial movements of said weights for transmission of said forces, a member movable in response to said forces and connected to said movable portion of said tension member, substantially frictionless swingable supporting means disposed to impart rigidity in one direction to constrain said movable member for substantially axial movement, means associated with said movable member adapted to effect movement of said controlled member, whereby the combined speed-responsive movements of said flyweight means and said movable member are substantially frictionless and thereby respond substantially instantaneously and consistently to minute changes in the forces produced by said flyweight means.

35. The combination of elements defined in claim 34 in which said flyweight means includes substantially frictionless swingable members acting to support each of said weights for substantially frictionless radial movement, said swingable members having width imparting rigidity in a direction transverse to the drection of said radial movements.

36. The combination of elements defined in claim 34 in which said flexible tension member comprises thin bendable strip means, and said swingable means supporting said movable member comprises spaced substantially parallel leaf spring members, and said means associated with said movable member includes a servo-mechanism.

37. The construction defined in claim 34 with contacting surfaces of said flexible tension member and of the said connection of said movable member being shaped to produce a point contact, the suspension of said movable member being disposed to produce relative rocking of the said movable member in relation to said flexible member instead of sliding movement, when axial misalignment of said movable member occurs in its operative movement.

38. In a centrifugal flyweight device, the combination of elements comprising, a rotatable member, two diametrically opposed weights, substantially frictionless swingable members connected to said rotatable member and acting to support each of said weights for substantially frictionless radial movements, a leaf spring member connecting said weights and having a portion adapted to move axially in response to radial movements of said weights, flexible means having width imparting rigidity in said radial direction to constrain said axially moving portion for substantially frictionless axial movements comprising a pair of leaf springs, the central portion of one of said spring pair being fixed to said rotatable member, and the central portion of the other of said spring pair being fixed to said axially moving portion of said leaf spring connecting member, the corresponding free ends of said two springs being fixed together.

39. In a mechanism having a movable member, and substantially frictionless swingable means imparting rigidity in one direction acting to support said movable member for substantially frictionless movements in a direction transverse to said first direction and to prevent surface contact of said supported member during operational movements thereof, said swingable means comprising the combination of, a pair of leaf springs, each of said spring pair being V-shaped and having two legs substantially at right angles to each other in the same plane, the end joining the two legs of one of said spring pair being fixed to a stationary portion of said mechanism, and the end joining the two legs of the other of said spring pair being fixed to said movable member, and the other corresponding two free ends of both of said springs being fixed together, and a second similarly arranged spring pair connected to said movable member at a distance from said first spring pair and substantially parallel thereto, whereby the movements of said member are produced along substantially a straight line.

40. In a mechanism having force-producing means, a movable force-responsive member having one end in contact with said force-producing means, two spaced substantially frictionless and parallel swingable members supporting said movable member, said swingable members being disposed to impart rigidity in one direction to constrain said movable member for substantially frictionless movements in substantially its axial direction, the supporting member closer to said force-producing means being longer than the supporting member remote therefrom, the relative length and spacing of said supporting members being such that said contact of said movable member and said force-producing member is maintained substantially without sliding as said movable member swings on its supporting members.

References Cited in the file of this patent

UNITED STATES PATENTS

| | | |
|---|---|---|
| 331,517 | McCarty | Dec. 1, 1885 |
| 626,171 | Lambert | May 30, 1899 |
| 1,017,571 | Loewenstein | Feb. 13, 1912 |
| 1,411,650 | Welling | Apr. 4, 1922 |
| 1,520,008 | Buckle | Dec. 23, 1924 |
| 1,584,268 | Alexander | May 11, 1926 |
| 1,777,370 | Kaspar | Oct. 7, 1930 |
| 1,852,918 | Chandler et al. | Apr. 5, 1932 |
| 1,857,477 | Ritter | May 10, 1932 |
| 2,064,779 | Briggs | Dec. 15, 1936 |
| 2,088,004 | Turck | July 27, 1937 |
| 2,237,780 | Gottlieb | Apr. 8, 1941 |
| 2,272,953 | Rooney | Feb. 10, 1942 |
| 2,298,112 | Edwards | Oct. 6, 1942 |
| 2,414,947 | Heinze | Jan. 28, 1947 |
| 2,416,973 | Wright | Mar. 4, 1947 |
| 2,454,551 | Carlson | Nov. 23, 1948 |
| 2,500,407 | Segerstad | Mar. 14, 1950 |
| 2,527,728 | Hoefer | Oct. 31, 1950 |
| 2,540,910 | Reger | Feb. 6, 1951 |
| 2,544,352 | Phelps | Mar. 6, 1951 |
| 2,611,603 | Hintz et al. | Sept. 23, 1952 |

FOREIGN PATENTS

| | | |
|---|---|---|
| 229,387 | Germany | Dec. 19, 1910 |
| 318,255 | Germany | Jan. 22, 1920 |